Oct. 26, 1948. W. SHIPPEE 2,452,331
FASTENER
Filed Jan. 1, 1945
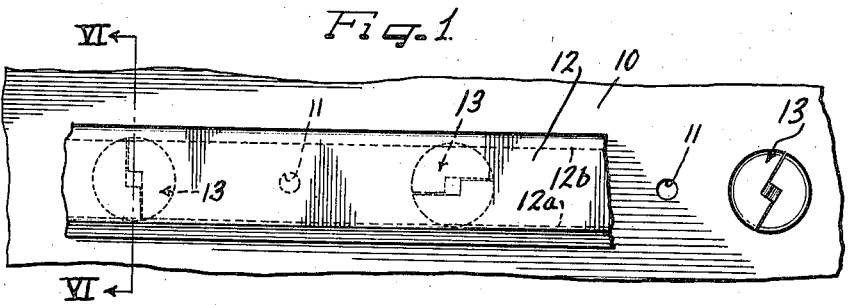
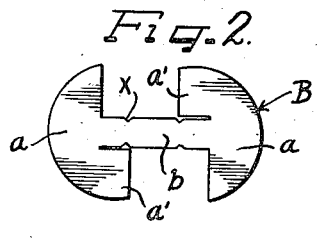
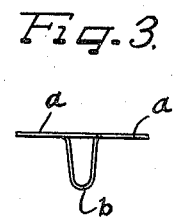
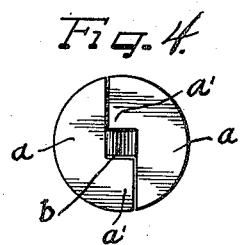
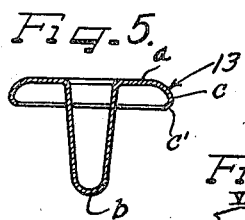
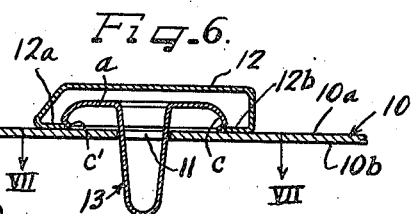
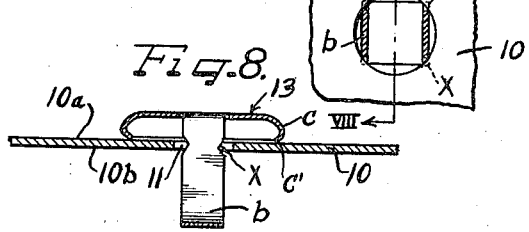
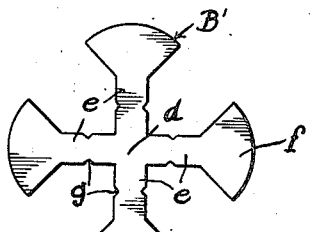
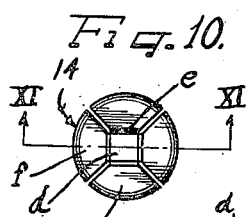
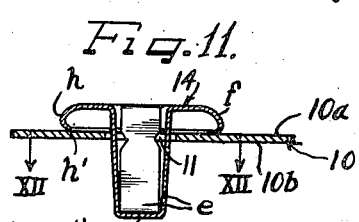
Inventor
WINSOR SHIPPEE Patented Oct. 26, 1948

2,452,331

UNITED STATES PATENT OFFICE 2,452,331

FASTENER

Winsor Shippee, Fair Haven, N. J.

Application January 1, 1945, Serial No. 570,866

4 Claims. (Cl. 24—73)

1

This invention relates to fasteners especially adapted for attaching moldings, trim strips and the like onto apertured wall members.

The invention specifically deals with clips or buttons adapted to be snapped into locked engagement with apertured sheet metal members and having circular heads for snap-fit engagement with trim strips.

Fastener clips for snap-fit attachment of trim strips to supporting walls have heretofore been provided with rectangular head portions that have had to be rotated into alignment for receiving a hollow trim strip. If the clips were loosely fitted in the wall it was difficult to hold the clip in alignment.

The present invention now provides fastener clips or buttons with circular heads for snap-fit engagement with hollow trim strips and the like. These circular heads need not be rotated to any particular position for receiving the trim strip, since the circular periphery of the head portion effectively engages the trim strip with a snap-fit at any point around the entire circumference thereof.

According to this invention a one-piece sheet metal clip or button is shaped to have a split circular head portion and a plurality of legs depending therefrom to form a stem or shank for the head portion. These legs are notched to provide locking shoulders. The head portion has a depending skirt with an inturned edge forming a locking shoulder for receiving a trim strip in snap-fit engagement therewith. The stem or shank of the button is adapted to be pressed into the aperture of a metal plate or the like and the legs spring outwardly in this aperture so that the locking shoulders of the notches in the legs will engage that face of the plate which is opposite the face bottoming the head portion.

To assemble trim strips and the like with the fasteners of this invention it is therefore merely necessary to snap the shanks of the fastener buttons in the apertures of a metal plate or the like and to snap the trim strips over the circular head of the button.

It is, then, an object of this invention to provide a fastener for attaching molding, trim strips or the like to a body member by merely snapping stem portions of the fasteners into apertures of the body and snapping the trim strips or molding over the heads of the fasteners.

A further object of the invention is to provide a fastener clip having a circular head portion for snap-fit engagement with trim strips, molding and

2 the like at any portion around its entire circumference.

A still further object of the invention is to provide fasteners which do not need to be rotatively aligned for securing a trim strip or molding to a body member.

A still further object of the invention is to provide a clip having opposed head portions cooperating to define a circular head and opposed spring legs cooperating to define a stem depending from the head and arranged for snap-fit engagement in the aperture of a body member.

Other and further objects of the invention will be apparent to those skilled in the art from the following detailed description of the annexed sheet of drawings which, by way of prefered examples only, illustrate two embodiments of the invention.

On the drawings:

Figure 1 is a plan view of an apertured body member and trim strip assembly illustrating the manner in which the fasteners of this invention secure the trim strip to the body member.

Figure 2 is a plan view of a blank from which the fasteners of this invention are made.

Figure 3 is an elevational view of a fastener according to this invention in an intermediate stage of manufacture.

Figure 4 is a plan view of the incompletely formed fastener shown in Figure 3.

Figure 5 is a vertical cross-sectional view of a completed fastener according to this invention.

Figure 6 is a vertical cross-sectional view taken along the line VI—VI of Figure 1.

Figure 7 is a horizontal cross-sectional view taken along the line VII—VII of Figure 6.

Figure 8 is a vertical cross-sectional view taken along the line VIII—VIII of Figure 7.

Figure 9 is a plan view of a blank from which a modified fastener according to this invention is made.

Figure 10 is a plan view of the modified fastener.

Figure 11 is a vertical cross-sectional view taken along the line XI—XI of Figure 10.

Figure 12 is a horizontal cross-sectional view taken along the line XII—XII of Figure 11.

As shown on the drawings:

In Figure 1 the reference numeral 10 designates a sheet metal body member such as an automobile body, a refrigerator cabinet, or the like. This sheet metal body member 10 has a plurality of spaced aligned apertures 11 therethrough. A mold strip or trim strip 12 is secured to the body member 10 by means of fasteners 13 having stem portions locked in the apertures 11.

The fasteners 13 of this invention are formed from a blank B shown in Figure 2. This blank B is readily stamped from flat sheet metal or strip stock and has spaced opposed fragmental circular heads a, a connected by a band-like strip b. The ends a, a have projecting inner portions a', a' on opposite sides of the connecting strip b. This connecting strip is notched at four places x.

As shown in Figures 3 and 4, the flat blank B of Figure 2 is bent to form the strip b into U shape thereby providing stem projecting from the central portion of a circular disk formed by the portions a, a. These portions a are brought together and the projecting tabs a' thereon bridge the gap between the legs of the U-shaped stem thereby cooperating with the portions a to form a complete circular periphery for the head.

As shown in Figure 5, the head a of the fastener 13 is stamped or spun to provide a depending skirt c thereon. This depending skirt c has an inturned edge c'.

The clip 13 of this invention is therefore composed of a circular head portion with a depending skirt having an inturned edge forming a locking shoulder around the entire circumference of the head together with a central stem portion composed of two spring-like legs. The legs are integral, being connected at the end of the stem through a base portion. This base portion connects the split head sections through the spring legs.

As shown in Figure 6, the trim strip 12 is hollow and has base flanges 12a and 12b bottomed on one face 10a of the body plate 10. The stem portion of the fastener 13 is pushed into the aperture 11 of the body member 10 and the legs of this stem portion tend to spring outwardly in the aperture so that the notches x receive the aperture-defining wall and one edge of each notch underlies the face 10b of the plate 10, as best shown in Figures 7 and 8. Since the edge c' of the head skirt is bottomed on one face 10a of the plate 10 while the locking shoulder portions of the notches x of the spring legs of the stem b are bottomed on the opposite face 10b of the same plate 10 the fastener clip 13 is attached to the plate 10.

The opposed inturned base flanges 12a and 12b of the trim strip 12 are spaced apart a distance somewhat less than the major diameter of the skirt c, so as to project under the locking shoulder provided by the inturned skirt edge c'. This skirt c is somewhat resilient and the trim strip 13 is readily snapped over the fastener head a with the base flanges 12a and 12b locked under the locking shoulder provided by the inturned skirt flange c'.

As illustrated in Figure 1, the fasteners 13 can be rotated to any position and still receive the trim strip 12 because the entire circumference of the fastener head has a locking shoulder therearound adapted for gripping the base flanges 12a and 12b of the trim strip.

As illustrated in Figures 5, 6 and 8, the skirt c of the fastener head is preferably rounded to facilitate snapping of the trim strip thereon.

In the modification shown in Figures 9 to 12 inclusive there is illustrated a fastener operating in the same general manner as the fastener illustrated in Figures 1 to 8. In the modification, however, the fastener has four spring legs and four head sections instead of two spring legs and two head sections.

In Figure 9, the reference character B' designates a stamped metal blank from which the modified fastener is formed. The blank B' has a square central portion d from the sides of which radiate four legs e. Each leg e has an arcuate segment f on the outer end thereof. Each leg is also notched on the opposite side edges thereof at g between the square base or central portion d and the outer segment f thereof.

The blank B' of Figure 9 is bent to form a fastener 14 shown in Figures 10 and 11. This fastener has a circular head composed of the four segments f of the blank and a stem or shank composed of the four legs e of the blank. The central portion d of the blank forms a closed base or bottom for the legs e.

As illustrated in Figure 11, the segments f of the head have a depending skirt h formed thereon with an inturned edge h'. This inturned edge h' is bottomed on the outer face 10a of the plate or other wall member 10 having the aperture 11 therein as explained above. The inturned edge h' of the skirt cooperates with the skirt h to provide a locking shoulder for receiving the base flanges of the trim strip such as 12 as illustrated in Figure 6 in connection with the fastener 13. The stem composed of the four legs e projects through the aperture 11 of the plate and these legs spring outwardly in the aperture so that the notches engage the wall defining the aperture. As illustrated in Figure 12 the bottom shoulder-defining portion of each notch underlies the plate 10 to engage the face 10b thereof. The stem is thus locked to the plate 10 at eight different points instead of at four different points, as in the fastener 13.

The fastener 14 is attached to the plate 10 in the same manner as described in connection with the fastener 13 and the trim strip 12 is snapped over the head of the fastener 14 in the same manner as described in connection with the fastener 13.

From the above descriptions it should be understood that this invention provides fasteners or button-type clips which have circular heads for anchoring trim strips or the like together with shank portions composed of spring legs having locking shoulders thereon for underlying a supporting member such as a metal plate or the like to bottom the heads on the opposite side of the body member. Since the fasteners have circular heads, they need not be rotated into aligned positions because they are capable of snap fit attachment with a trim strip at any point around the entire circumference thereof.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A fastener comprising a one-piece metal member having a split circular head portion composed of a plurality of pieces but defining a substantially complete circumference, a plurality of legs joining the split head pieces and projecting from the central part of said head to form a stem on the member, said head having a depending peripheral skirt with an inturned edge providing a locking shoulder, and each leg being in the form of a flat ribbon with a locking shoulder opposing said edge of the skirt to cooperate therewith in attaching the member.

2. A fastener comprising a one-piece metal member having a split circular head portion defining a substantially complete circumference with a resilient rounded skirt having an inturned edge providing a locking shoulder and spring legs projecting from the central part of said head portion to form a stem, said spring legs having locking shoulders thereon opposing the edge of the skirt to cooperate therewith for retaining the fastener in position.

3. A clip adapted to be applied to an aperture in a supporting wall in substantial locking engagement therewith and form a retainer for a hollow molding strip, said clip comprising a piece of sheet metal having a band forming a pair of opposed spring legs, circular head sections on the free ends of said spring legs extending radially from said free ends, said head sections cooperating with each other to define a circular head having a substantially complete circumference, a skirt on each head section cooperating with the skirts of the other head sections to define a circular locking shoulder, and notches in the side edges of said legs arranged for engaging an aperture-defining wall to lock the clip to an apertured member.

4. A fastener comprising a base portion, four upstanding spring legs on said base portion, outturned head sections on the free ends of said upstanding legs, said head sections cooperating to define a circular head, said head having a depending peripheral skirt with an inturned edge providing a locking shoulder and said legs having lock shoulders in the side edges thereof between said head sections and said base for retaining the fastener in an aperture in a wall.

WINSOR SHIPPEE.

REFERENCES CITED

The following references are of record in the file of this patent:

UNITED STATES PATENTS

| Number | Name | Date |
|---|---|---|
| 739,762 | Washburne | Sept. 22, 1903 |
| 1,682,532 | Maise | Aug. 28, 1928 |
| 1,896,875 | Walters | Feb. 7, 1933 |
| 2,084,559 | Jones | June 22, 1937 |
| 2,137,210 | Lombard | Nov. 15, 1938 |
| 2,194,855 | Jones | Mar. 26, 1940 |
| 2,300,478 | Wiley | Nov. 3, 1942 |

FOREIGN PATENTS

| Number | Country | Date |
|---|---|---|
| 476,990 | Great Britain | Dec. 20, 1937 |